US012653340B2

(12) United States Patent
Fullmer et al.

(10) Patent No.: US 12,653,340 B2
(45) Date of Patent: Jun. 16, 2026

(54) OUTDOOR COOKING STATION WITH A PELLET FEEDER FOR SMOKING FOOD

(71) Applicant: North Atlantic Imports, LLC, Logan, UT (US)

(72) Inventors: Tyler J. Fullmer, Smithfield, UT (US); Christopher L. Hanks, Logan, UT (US); David Clark, Saratoga Springs, UT (US); Michael R. Giebel, Joplin, MO (US); Paul J. Simon, Elizabethtown, KY (US)

(73) Assignee: North Atlantic Imports, LLC, Providence, UT (US)

( * ) Notice: Subject to any disclaimer, the term of this patent is extended or adjusted under 35 U.S.C. 154(b) by 610 days.

(21) Appl. No.: 17/337,310

(22) Filed: Jun. 2, 2021

(65) Prior Publication Data

US 2021/0369052 A1    Dec. 2, 2021

Related U.S. Application Data

(60) Provisional application No. 63/033,690, filed on Jun. 2, 2020.

(51) Int. Cl.
*A47J 37/07*    (2006.01)

(52) U.S. Cl.
CPC ....... *A47J 37/0704* (2013.01); *A47J 37/0786* (2013.01)

(58) Field of Classification Search
CPC .......................... A47J 37/0786; A47J 37/0704
USPC .......................................................... 99/324
See application file for complete search history.

(56) References Cited

U.S. PATENT DOCUMENTS

| | | | | |
|---|---|---|---|---|
| 3,789,824 A | * | 2/1974 | Mason | F24B 5/06 |
| | | | | 99/345 |
| 3,809,056 A | * | 5/1974 | Snelling | A23B 4/0523 |
| | | | | 99/476 |
| 4,700,618 A | * | 10/1987 | Cox, Jr. | A23B 4/052 |
| | | | | 99/481 |
| 4,823,684 A | | 4/1989 | Traeger et al. | |
| 5,183,028 A | | 2/1993 | Traeger et al. | |
| 5,251,607 A | * | 10/1993 | Traeger | A47J 37/0704 |
| | | | | 126/73 |
| 5,299,888 A | * | 4/1994 | Wysong | B65G 65/46 |
| | | | | 406/67 |
| 6,131,505 A | | 10/2000 | Lin | |
| 7,231,917 B2 | | 6/2007 | Frederiksen | |
| 7,757,604 B2 | | 7/2010 | Gonzalez | |
| 8,931,400 B1 | | 1/2015 | Allen | |

(Continued)

FOREIGN PATENT DOCUMENTS

| | | | | |
|---|---|---|---|---|
| IT | 1124416 B | * | 5/1986 | |
| WO | WO2016153547 | | 9/2016 | |

OTHER PUBLICATIONS

IT1124416B Machine Translate (Year: 2026).*

*Primary Examiner* — Steven W Crabb
*Assistant Examiner* — Yeong Juen Thong
(74) *Attorney, Agent, or Firm* — David L. Stott

(57) ABSTRACT

Embodiments of an outdoor cooking station having a main body with a pellet feeding system integrated with the cooking station for feeding heated smoke to a cooking chamber. The pellet feeding system utilizes a paddle wheel for feeding pellets to be burned and generating heated smoke. The heated smoke moves through a ducting system that is adjustable for distributing smoke to the cooking chamber.

9 Claims, 13 Drawing Sheets

(56)                References Cited

U.S. PATENT DOCUMENTS

| | | | |
|---|---|---|---|
| 9,289,096 | B2 | 3/2016 | Barkhouse et al. |
| 9,635,978 | B2 | 5/2017 | Measom et al. |
| 9,693,569 | B2 | 7/2017 | Wingerd et al. |
| 9,759,429 | B2 | 9/2017 | Tucker |
| 9,814,354 | B2 | 11/2017 | McAdams et al. |
| 9,930,991 | B2 | 4/2018 | Traeger |
| 10,045,546 | B2 | 8/2018 | Giebel et al. |
| 10,058,212 | B2* | 8/2018 | Barajas ................ F24C 15/107 |
| 10,105,007 | B2 | 10/2018 | Colston et al. |
| 10,158,720 | B2 | 12/2018 | Colston et al. |
| 10,213,051 | B2 | 2/2019 | Colston et al. |
| 10,218,833 | B2 | 2/2019 | Colston |
| 10,222,092 | B1 | 3/2019 | Traeger |
| 10,292,531 | B1 | 5/2019 | Hancock et al. |
| 10,426,295 | B2 | 10/2019 | McAdams et al. |
| 10,455,022 | B2 | 10/2019 | Colston |
| 10,455,979 | B2 | 10/2019 | Colston et al. |
| 10,491,738 | B2 | 11/2019 | Colston |
| 10,568,461 | B2 | 2/2020 | Colston et al. |
| 10,652,386 | B2 | 5/2020 | Colston |
| 10,660,474 | B2 | 5/2020 | Gafford |
| 10,674,866 | B2 | 6/2020 | Colston |
| 10,701,199 | B2 | 6/2020 | Colston |
| 10,708,409 | B2 | 7/2020 | Colston |
| 10,711,995 | B2 | 7/2020 | Traeger |
| 10,729,283 | B2 | 8/2020 | McAdams et al. |
| 10,735,523 | B2 | 8/2020 | Colston |
| 10,735,575 | B2 | 8/2020 | Colston |
| 10,806,301 | B2 | 10/2020 | Hancock et al. |
| 2002/0189603 | A1 | 12/2002 | Hsu |
| 2004/0200394 | A1 | 10/2004 | Krumrei |
| 2004/0255926 | A1 | 12/2004 | Waits et al. |
| 2005/0098169 | A1 | 5/2005 | Frederiksen |
| 2007/0131113 | A1* | 6/2007 | Gadbury ................. B67D 7/76 95/273 |
| 2007/0175467 | A1 | 8/2007 | Liu |
| 2007/0215021 | A1 | 9/2007 | Krumrei |
| 2008/0078374 | A1 | 4/2008 | Polkinghorn et al. |
| 2009/0038603 | A1 | 2/2009 | Hepper et al. |
| 2009/0183729 | A1 | 7/2009 | Barkhouse et al. |
| 2010/0218754 | A1* | 9/2010 | Kuntz ................ A47J 37/0786 126/25 R |
| 2011/0219958 | A1 | 9/2011 | Noble |
| 2011/0271947 | A1 | 11/2011 | Nilssen, II |
| 2011/0271949 | A1 | 11/2011 | Ortner et al. |
| 2013/0011535 | A1 | 1/2013 | Mafi |
| 2013/0206015 | A1* | 8/2013 | Jacoby ................... A47J 37/07 99/330 |
| 2014/0067649 | A1 | 3/2014 | Kannan et al. |
| 2014/0154381 | A1 | 6/2014 | Mafi |
| 2014/0326232 | A1 | 11/2014 | Traeger |
| 2015/0144238 | A1 | 5/2015 | Traeger |
| 2016/0037966 | A1 | 2/2016 | Chin et al. |
| 2017/0065124 | A1 | 3/2017 | Colston |
| 2017/0095106 | A1 | 4/2017 | Cook |
| 2017/0164783 | A1 | 6/2017 | Sauerwein et al. |
| 2017/0176018 | A1* | 6/2017 | Traeger ................... F24B 13/04 |
| 2017/0238758 | A1 | 8/2017 | Rummel et al. |
| 2018/0168397 | A1 | 6/2018 | Colston |
| 2018/0213974 | A1 | 8/2018 | Mafi |
| 2018/0368618 | A1* | 12/2018 | Measom ............. A47J 37/0704 |
| 2019/0133374 | A1 | 5/2019 | McAdams et al. |
| 2019/0150663 | A1 | 5/2019 | Colston et al. |
| 2019/0277507 | A1 | 9/2019 | Colston et al. |
| 2019/0290064 | A1 | 9/2019 | Colston et al. |
| 2019/0290066 | A1 | 9/2019 | Colston |
| 2019/0290069 | A1 | 9/2019 | Colston et al. |
| 2019/0335949 | A1 | 11/2019 | Simon et al. |
| 2020/0033008 | A1* | 1/2020 | Baker ................... F24B 13/04 |
| 2020/0245813 | A1* | 8/2020 | Traeger ............... A47J 37/0754 |

* cited by examiner

OUTDOOR COOKING STATION WITH A PELLET FEEDER FOR SMOKING FOOD

CROSS-REFERENCE TO RELATED APPLICATIONS

This application claims the benefit of U.S. Provisional Application No. 63/033,690, filed Jun. 2, 2020, the disclosure of which is hereby incorporated by reference herein in its entirety.

TECHNICAL FIELD

The present invention relates generally to outdoor cooking stations and, more specifically, the present invention relates to smoker type outdoor cooking stations.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame.

Further, another mode for grilling that imparts unique flavors to food is by generating heated smoke to the grill, often called a "smoker." Some smoker devices generate the heated smoke by using pellets as a fuel source. Examples of the characteristics of pellets as a fuel source may be found in U.S. Pat. No. 8,328,884. Typically, the pellets are delivered to a fire pot with an auger within the smoker device. The auger typically sits in a horizontal position to linearly move the pellets toward the fire pot. Once the pellets are funneled into the fire pot, the pellets may be burned with an electrical heating element, often referenced as a "hot rod," for generating heated smoke for heating a cooking chamber. Smoker devices using pellets are popular because of the variety of flavored pellets available and the ability to pre-program the temperature and time period for the smoker device to cook the food, thereby, allowing the user to be less attentive to the food being cooked by the smoker device. One example of a smoker device utilizing an auger for feeding pellets to a pellet burner unit is disclosed in U.S. Pat. No. 9,814,354. However, one problem that persists with feeding pellets with an auger is that pellets often are not consistent in their sizing and, as such, the various sized pellets can cause the auger to jam and become clogged and also result in undesired changes in the temperature of the smoker device. When jamming or clogging initially occurs the user of the smoker device is typically not aware due to the pre-programed nature of the smoker device. Once the user learns and diagnosis the problem, and eventually unjams or unclogs the auger, there typically is a substantial delay in the cooking of the food which can be difficult and very undesirable under some circumstances.

BRIEF SUMMARY OF THE INVENTION

The present invention is directed to various embodiments of an outdoor cooking station configured to be at least partially heated with burning pellets. In one embodiment, the outdoor cooking station includes a main body and a pellet feeding system. The main body extends to define a front side, a rear side, a left side and a right side each extending from a lower end to a cooking chamber in an upper portion of the main body, the cooking chamber having a cooking surface. The pellet feeding system includes a pellet hopper, a paddle wheel, a fire pot, and a duct. The paddle wheel is sized and configured to rotate about an axis defined by the paddle wheel. The paddle wheel includes multiple paddles extending radially relative to the axis. The paddle wheel is configured to receive pellets from a bottom opening of the pellet hopper such that one or more pellets are received between adjacently extending paddles of the paddle wheel to move pellets to a sloped surface in a controlled manner to the fire pot so that a burning element may burn the pellets in the fire pot so that heated smoke moves upward through the duct and into the cooking chamber.

In another embodiment, the paddle wheel rotates to move pellets about the axis of the paddle wheel in a non-linear manner. In another embodiment, the paddle wheel is rotatable in a bi-rotational manner. In another embodiment, the paddle wheel is sized and configured to move the pellets in a non-linear, rotating manner such that the pellets correspondingly rotate with the paddle wheel. In another embodiment, the paddle wheel includes at least six paddles extending radially relative to the axis of the paddle wheel.

In another embodiment, the duct extends from the fire pot to a heat distribution portion, the heat distribution portion being adjustable so as to adjust the heated smoke to the cooking chamber. In another embodiment, the outdoor cooking station further includes a heat distribution portion, the heat distribution portion configured to receive heated smoke from the duct, the heat distribution portion having a sliding vent to adjust smoke distribution to the cooking chamber.

In another embodiment, the duct extends from the fire pot toward a moveable vent, the vent being adjustable so as to at least partially adjust a direction of the heated smoke to the cooking chamber. In still another embodiment, the duct extends to a deflector member, the deflector member positioned to deflect heated smoke to a moveable vent below the cooking chamber. In yet another embodiment, the front side of the main body defines an access opening with a moveable lid, the access opening sized and configured to receive the pellets to the hopper. In another embodiment, the hopper is positioned below the cooking chamber such that the hopper is positioned within a cabinet structure of the main body.

In accordance with another embodiment of the present invention, an outdoor cooking station configured to be at least partially heated with burning pellets is provided. The cooking station includes a main body and a pellet feeding system. The main body includes a cooking chamber with a main cooking surface, the main body having a hood pivotably coupled to the main body between an open position and a closed position. The pellet feeding system is coupled to the main body. Further, the pellet feeding system includes a paddle wheel sized and configured to rotate about an axis to define multiple paddles extending radially relative to the axis. The paddle wheel is sized and configured to transfer pellets to a fire pot with rotational movement of the pellets about the axis of the paddle wheel for heating the cooking chamber.

In another embodiment, the paddle wheel rotates with controlled rotation relative to a desired temperature of the cooking chamber. In another embodiment, the paddle wheel is rotatable in a bi-rotational manner. In another embodiment, the paddle wheel is sized and configured to move the pellets non-linearly, in a rotating manner such that the pellets rotate with the paddle wheel. In still another embodiment, the paddle wheel includes at least six paddles extending radially relative to the axis of the paddle wheel.

In another embodiment, the fire pot extends to a duct system, the duct system being adjustable and extending to the cooking chamber. In another embodiment, the cooking station further includes a main duct extending between the fire pot and a heat distribution portion, the heat distribution portion including structure to distribute heated smoke with an adjustment mechanism.

In another embodiment, the pellet feeding system includes a pellet chute accessed with a lid along a front side of the main body. In another embodiment, the cooking station further includes a vertically extending duct extending from the fire pot and toward the cooking chamber with a deflector member adjacent a top end of the vertically extending duct, the deflector member configured to deflect heated smoke toward a vent.

In accordance with another embodiment of the present invention, an outdoor cooking station configured to be heated with pellets is provided. The outdoor cooking station includes a main body, a burning chamber, and a heat distribution portion. The main body includes a cooking chamber with a main cooking surface, the main body having a hood pivotably coupled to the main body between an open position and a closed position. The burning chamber is coupled to the main body, the burning chamber sized and configured to hold a burnable element or pellets for generating heated smoke. The heat distribution portion is coupled to the main body and configured to receive the heated smoke from the burning chamber and distribute the heated smoke to the cooking chamber. With this arrangement, the heat distribution portion includes an adjustment mechanism for adjusting a flow path of the heated smoke.

In another embodiment, the adjustment mechanism is a slidable vent, the slidable vent moveable between a vent closed position and a vent open position such that, upon the slidable vent being moved to the vent open position, heated smoke is moveable below the main cooking surface. In another embodiment, the slideable vent is moveable with a handle positioned along a front side of the main body. In still another embodiment, the heat distribution portion includes multiple vents sized and configured to move heated smoke above the main cooking surface of the cooking chamber so that the heated smoke completely surrounds the main cooking surface as the heated smoke enters the cooking chamber.

In another embodiment, the main cooking surface extends with a grill structure. In still another embodiment, the main cooking surface is a griddle with a flat cooking surface.

In accordance with another embodiment of the present invention, a method for feeding pellets within an outdoor cooking station to provide fuel to the outdoor cooking station is provided. The method includes the steps of: moving pellets to the fire pot with a paddle wheel configured to rotate about an axis, the paddle wheel rotating at a controlled rate such that pellets are carried by the paddle wheel so as to rotate about the axis of the paddle wheel; and heating a cooking chamber of the outdoor cooking station with heated smoke by burning the pellets in the fire pot.

In another embodiment, the method further includes the step of distributing the heated smoke to the cooking chamber through a heat distribution portion. In another embodiment, the step of distributing the heated smoke includes adjusting the distributing of the heated smoke manually with an adjustable vent associated with the heat distribution portion. In another embodiment, the step of distributing the heated smoke includes funneling heated smoke to a peripheral vent portion surrounding a cooking surface in the cooking chamber. In still another embodiment, the step of distributing the heated smoke includes funneling smoke to an underside of a cooking surface in the cooking chamber. In another embodiment, the method includes funneling the heated smoke to the cooking chamber through a heat distribution portion such that the heat distribution portion is adjustable for controlling a pathway of the heated smoke. In still another embodiment, the funneling step includes funneling the heated smoke through a vent with a deflector member, the deflector member positioned above the fire pot. In another embodiment, the method steps include feeding pellets to a hopper positioned above the paddle wheel such that the pellets are fed through an access opening positioned along a front side of the cooking station and along a stationary pellet chute sloped toward the hopper.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
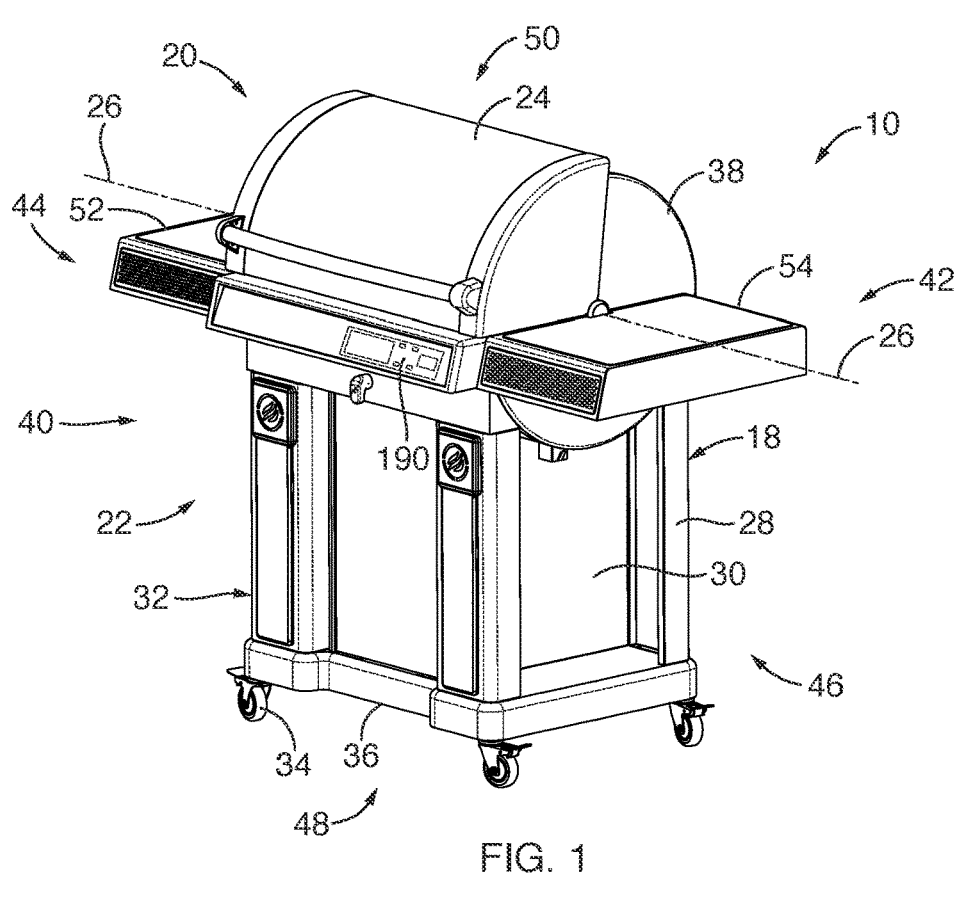
FIG. 1 is a perspective view of a cooking station with a hood in a closed position, according to an embodiment of the present invention.
Figure 2:
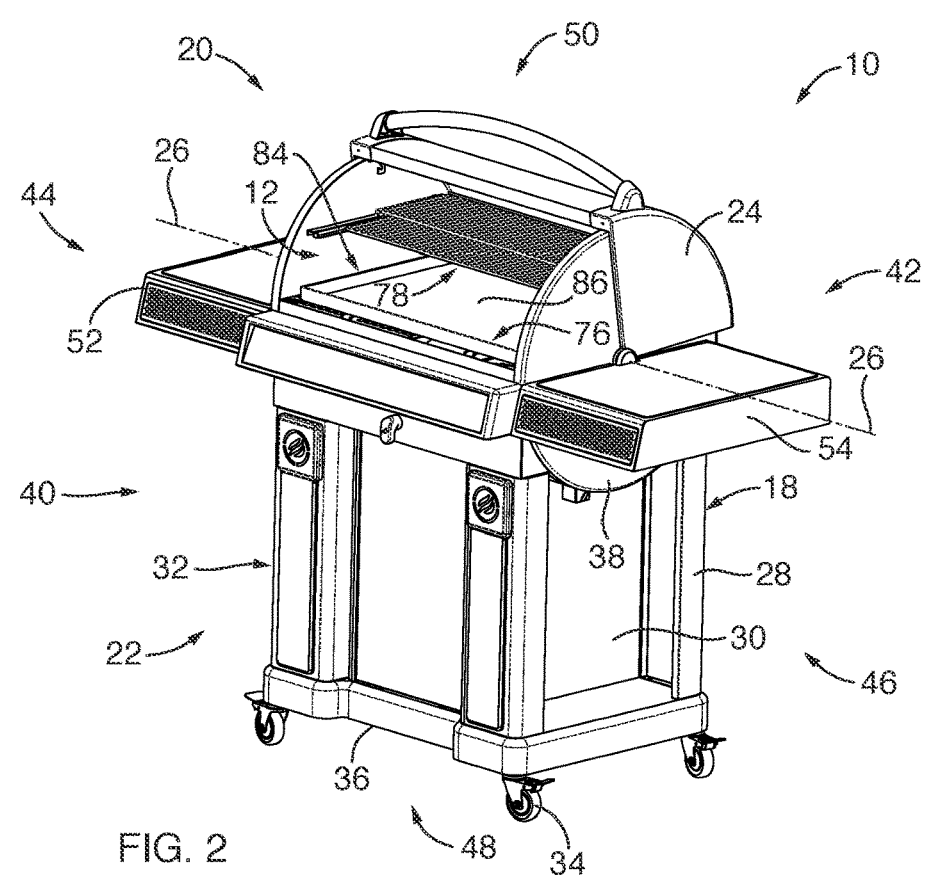
FIG. 2 is a perspective view of the cooking station with the hood in an open position, according to another embodiment of the present invention.
Figure 10:
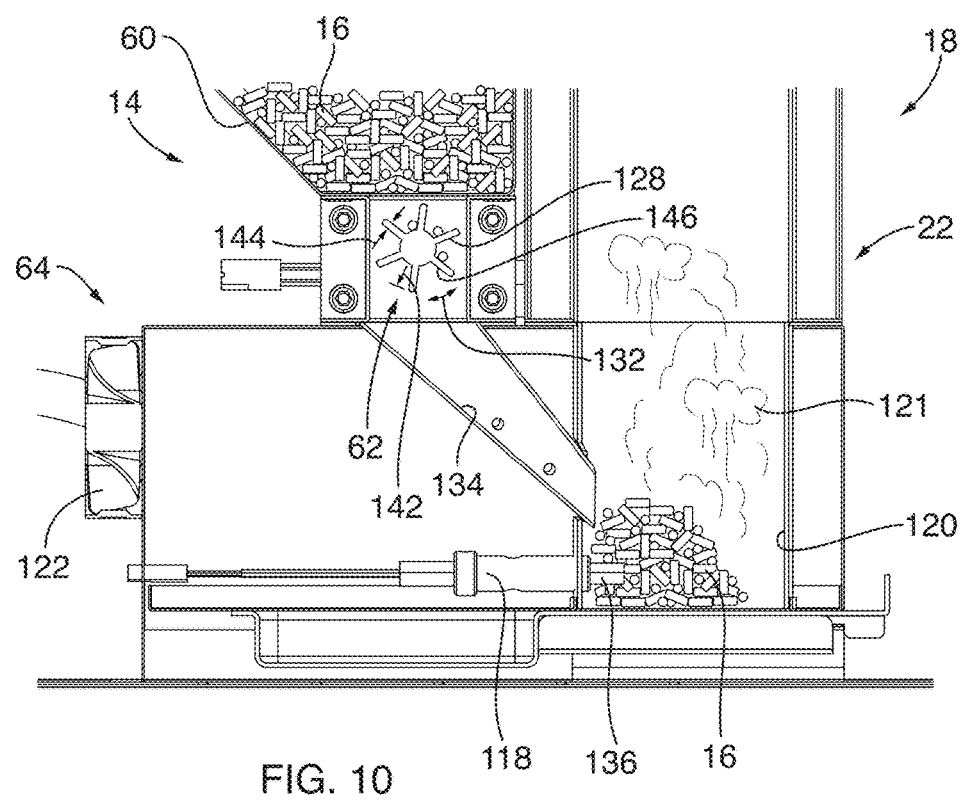
FIG. 10 is an enlarged side view of the pellet feeding system, depicting pellets being moved to the fire port with the paddle wheel, according to another embodiment of the present invention.

Referring to FIGS. 1, 2 and 10, a cooking station 10 sized and configured to provide heat to a cooking chamber 12 with heated smoke 121 is provided. Such heated smoke 121 may be generated by burning pellets 16, such as flavored pellets, or any other suitable burning substance. The cooking station 10 may be of the type for outdoor use and may also be portable. The cooking station 10 may include a pellet feeding portion 14 or system for feeding pellets, or the like, in a manner that provides more consistent sizing of pellets as well as minimizing pellets becoming jammed in the pellet feeding portion 14. Other unique features are provided in the cooking station 10, as set forth below.

With reference to FIGS. 1 and 2, the cooking station 10 may include a main body 18 extending to define an upper portion 20 and a lower portion 22, the upper portion 20 exhibiting the cooking chamber 12 and a hood 24. The hood 24 may be moveable so as to pivot about a pivot axis 26 between a closed position and an open position, as depicted in respective FIGS. 1 and 2. The upper and lower portions 20, 22 of the main body may include frame components and panels. The lower portion 22 may extend to resemble or define a cabinet type structure 32 with wheels 34, such as caster wheels, at a lower end 36 of the frame components 28 and panels 30. Such wheels 34 readily facilitate portability of the cooking station 10. The main body 18 may partially extend with a barrel type structure 38. The barrel type structure 38 may extend to the upper portion 20 and the lower portion 22 of the main body 18. The main body 18 may extend to define a front side 40, a rear side 42, a first side 44, a second side 46, a bottom side 48 and a top side 50. In regard to the main body 18, the front side 40 may be opposite the rear side 42, the first side 44 may be opposite the second side 46, and the bottom side 48 may be opposite the top side 50. The front side 40 of the main body 18 may be the side for accessing the cooking chamber 12, among other things, as set forth herein. The first side 44 of the main body may include a first side shelf 52 and the second side 46 of the main body 18 may include a second side shelf 54. Such first and second side shelves 52, 54 provide additional surfaces and space to assist the user while cooking with the cooking station 10.

Figures 3, 4:
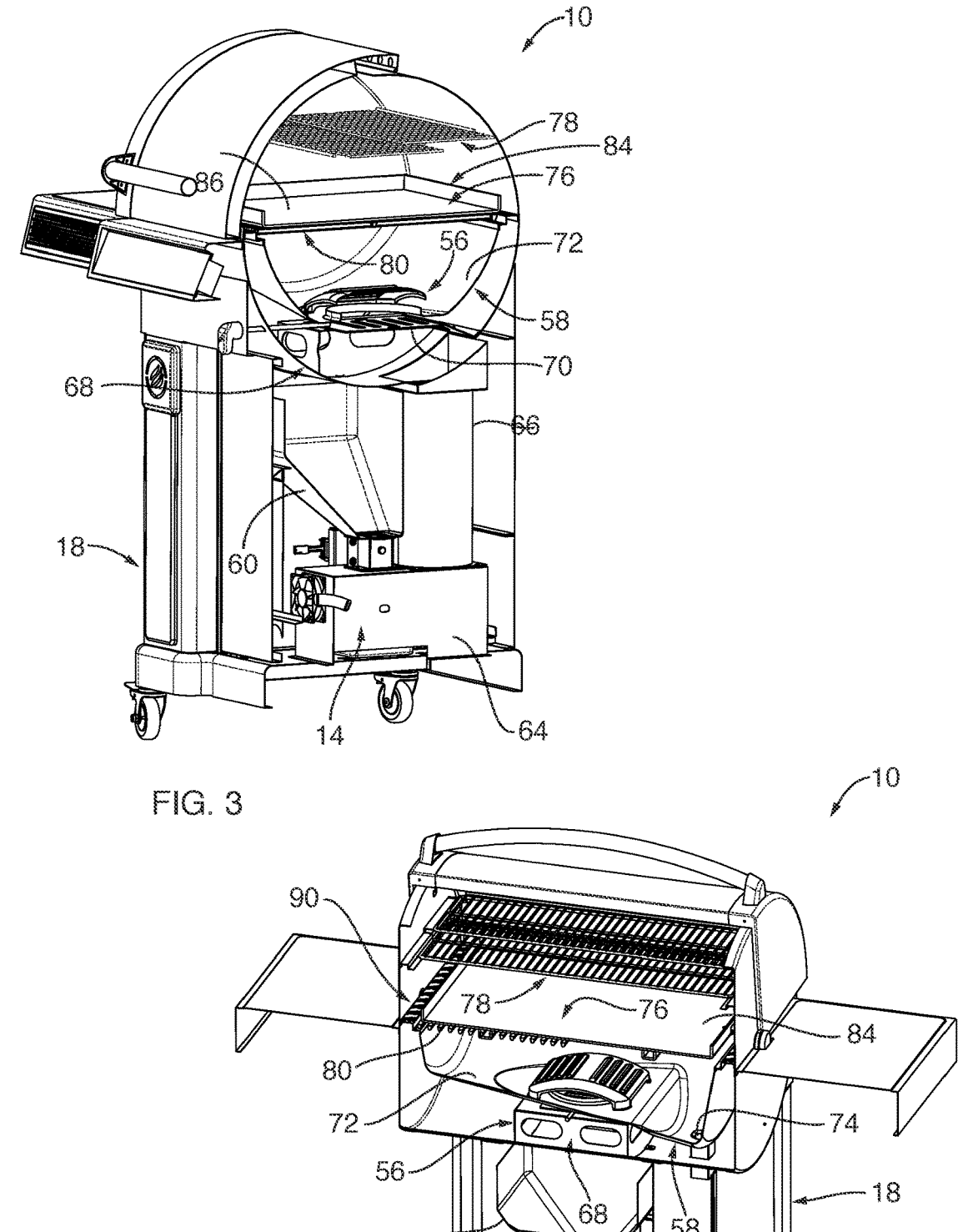
FIG. 3 is a perspective cross-sectional view of the cooking station taken along section line A-A of FIG. 1, depicting a pellet feeder system, according to another embodiment of the present invention.
FIG. 4 is a perspective cross-sectional view of the cooking station taken along section line B-B of FIG. 2, according to another embodiment of the present invention.

With reference to FIGS. 3 and 4, side and front cross-sectional perspective views of the main body 18 of the cooking station 10 are provided to show various portions or components of the cooking station 10. For example, the cooking station 10 may include the pellet feeding portion 14, a ducting portion 56, and a grease draining portion 58. The pellet feeding portion 14 may include a hopper 60, a paddle wheel 62 (FIG. 10), and a pellet burning portion 64, each component discussed in further detail herein. The ducting portion 56 or system may include one or more ducts 66, a heat distribution portion 68, and a sliding vent 70, the sliding vent 70 moveable to manipulate the distribution of heated smoke through the heat distribution portion 68 within cooking station 10. The grease draining portion 58 may include a sloped floor 72 extending with a hole 74 defined in a lower most portion of the sloped floor 72.

Figure 11:
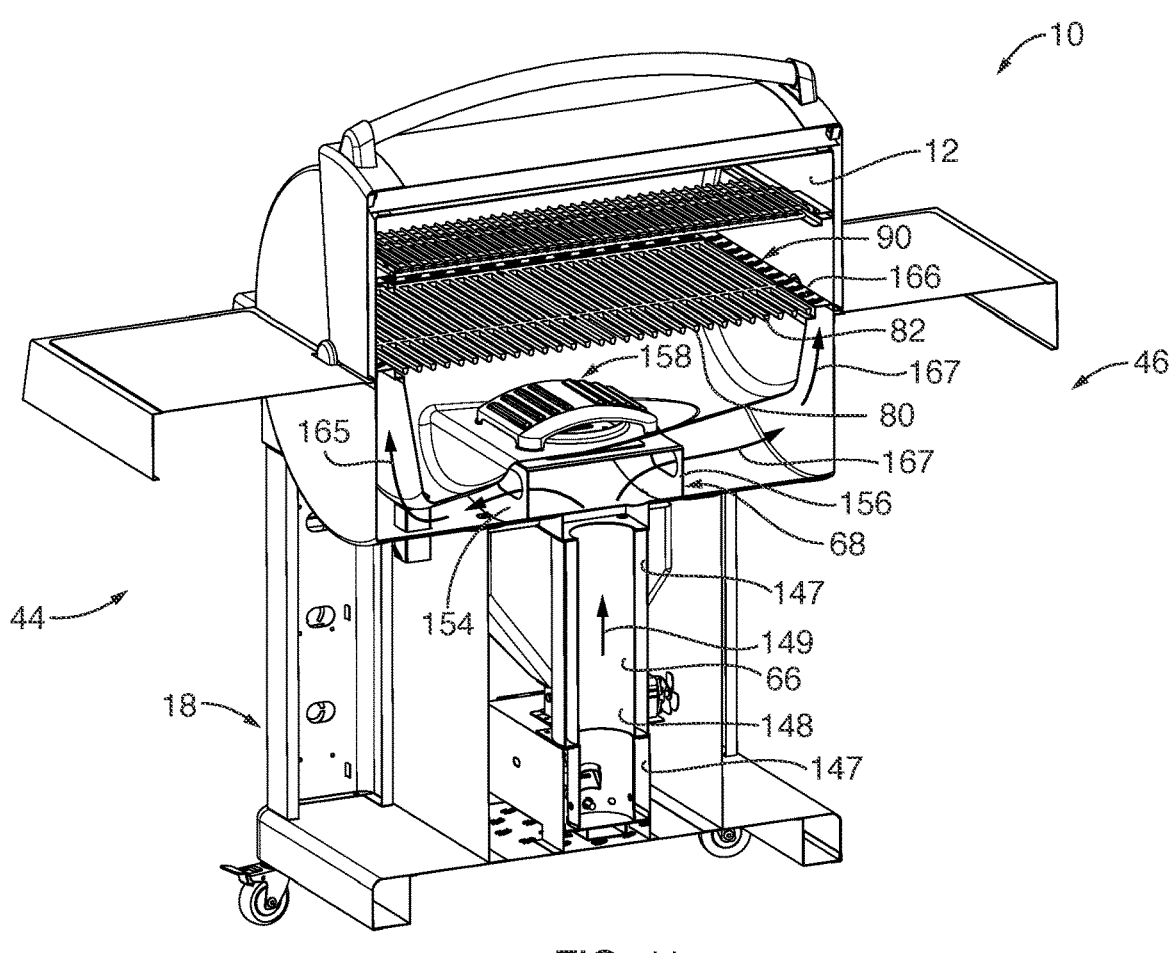
FIG. 11 is a front perspective cross-sectional view of a venting system of the cooking station, according to another embodiment of the present invention.
Figure 12:
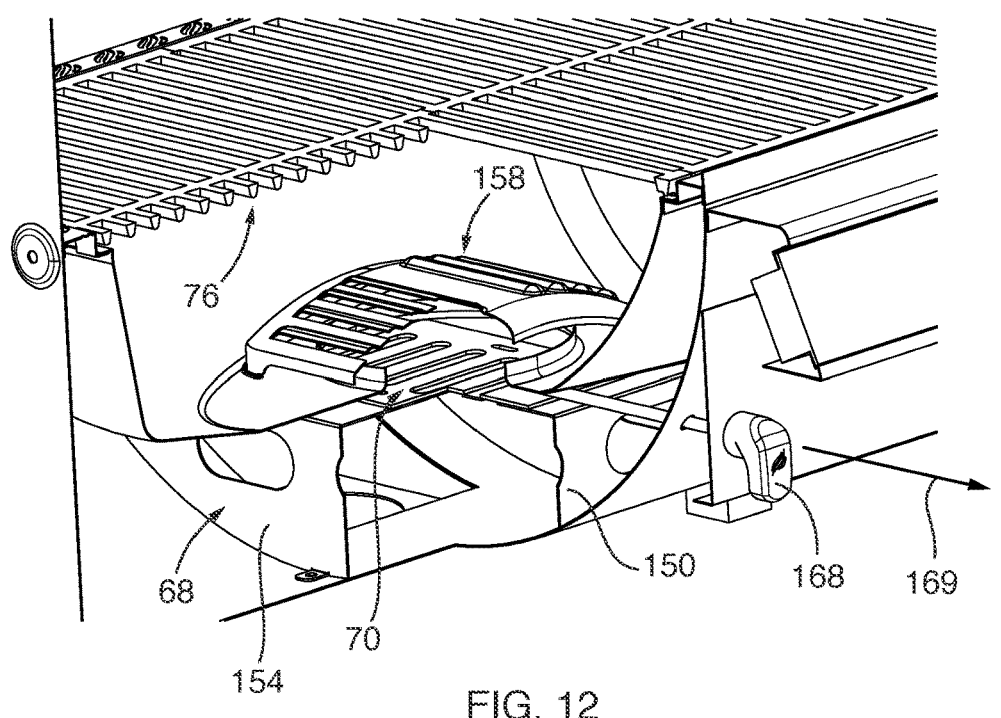
FIG. 12 is an enlarged cut-out perspective view of a portion of the venting system, according to another embodiment of the present invention.

As depicted in FIGS. 2-4, the cooking chamber 12 may include a main cooking portion 76 and an upper cooking portion 78. Further, the cooking chamber 12 may be defined as the heated space above the main cooking portion 76 and bound by the walls of the upper portion 20 of the main body as well as the hood 24. The main cooking portion 76 may extend with a main grill 80, the main grill 80 being sized and configured to be employed as a cooking surface 82 for placing food thereon (see FIG. 11). Further, the main cooking portion 76 may be sized and configured to hold a griddle 84 to sit on the main grill 80 with a flat cooking surface 86 for placing food thereon. The cooking chamber 12 may include a peripheral vent portion 90. Such peripheral vent portion 90 may be sized and configured to provide heated smoke to the cooking chamber 12. In another embodiment, the heated smoke may move through the peripheral vent portion 90 to provide heated smoke above the main grill 80 in the cooking chamber 12 of the cooking station 10. In another embodiment, the cooking chamber 12 may receive heated smoke through the ducting portion 56 to provide heat above the main grill 80 and to an underside of the man grill 80 and, if employing the griddle 84, to the underside of the griddle 84. Further, in another embodiment, the peripheral vent portion 90 may extend so as to entirely or substantially surround the main grill 80. In this manner, the heated smoke may move through the peripheral vent portion 90 to surround the main grill 80 and fill the cooking chamber 12 with the heated smoke.

Figures 5, 6:
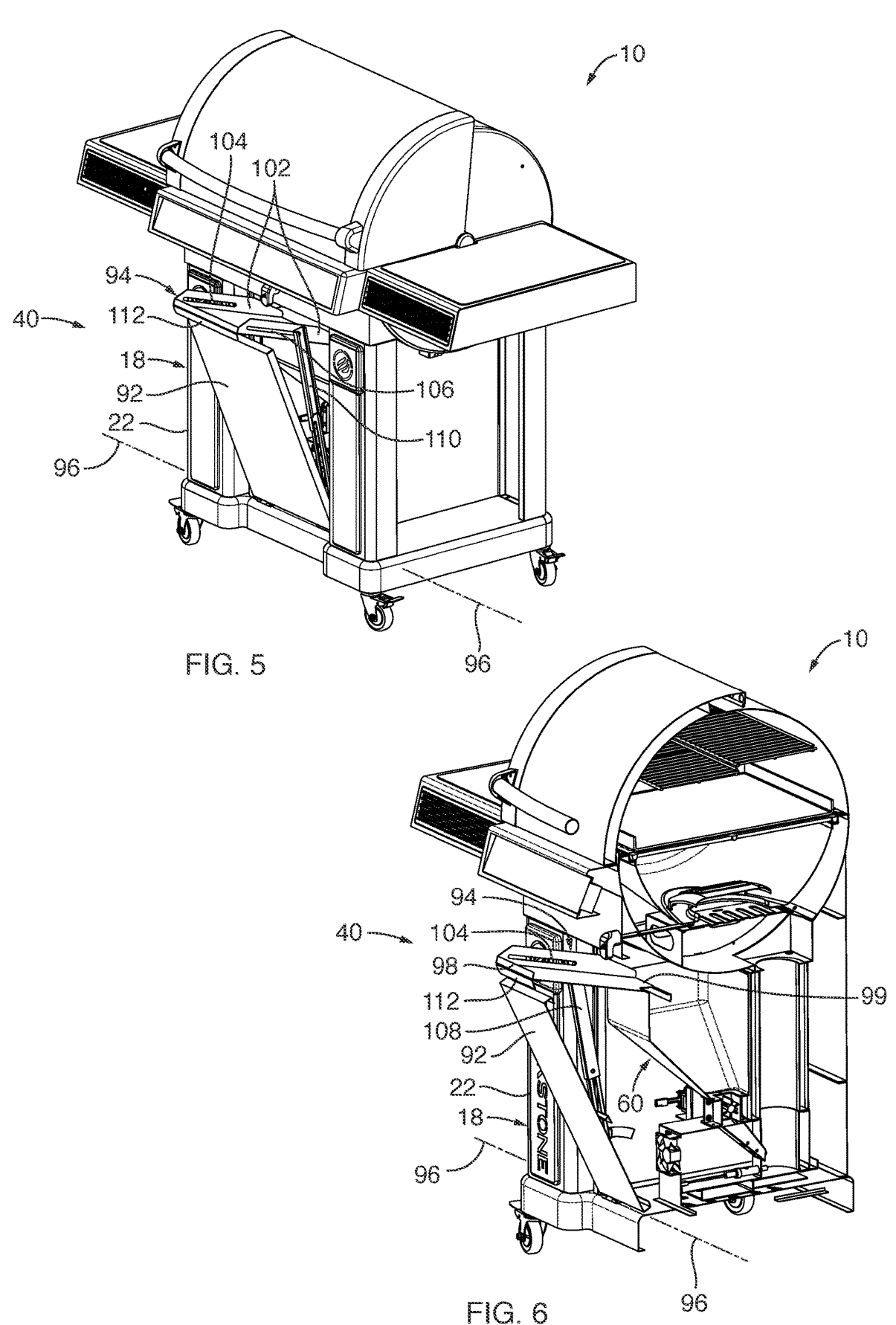
FIG. 5 is a perspective view of the cooking station, depicting a hopper door and hopper feed tray in open positions, according to another embodiment of the present invention.
FIG. 6 is a perspective cross-sectional side view of the cooking station taken along section line C-C of FIG. 5, depicting a hopper associated with the hopper door and hopper feed tray, according to another embodiment of the present invention.

Now with reference to FIGS. 5 and 6, the hopper 60 may be filled with pellets (and emptied) by accessing the hopper 60 along the front side 40 of the cooking station 10. In one embodiment, the front side 40 of the cooking station 10 may include a door 92 and a hopper feeding tray 94. The door 92 may pivot about a door axis 96 at a lower end of the door 92, the door 92 movable between a closed position (see FIG. 1) and various open positions. The hopper feeding tray 94 may extend between forward and rearward ends 98, 99 with opposing sidewalls 102 extending between the forward and rearward ends 98, 99. The opposing sidewalls 102 may define first and second slots 104, 106 therein. The tray 94 may be supported and coupled to first and second links 108, 110 each with one end that may be slidingly coupled to the respective first and second slots 104, 106 defined in the tray 94 and the other end pivotably coupled to the lower portion 22 of the main body 18. Further, the forward end 98 of the tray 94 may include a downward extending lip 112 sized so that the tray 94 may also be supported by the door 92. With the tray 94 supported by the first and second links 108, 110 and the door 92, the tray 94 may be oriented with a slope extending downward toward the hopper 60. In this manner, the tray 94 is moveable to an open position in an orientation that facilitates pellets to be poured over an upper surface of the tray 94 so that the pellets funnel into the hopper 60 so as to act as a pellet chute or hopper chute.

Figure 7:
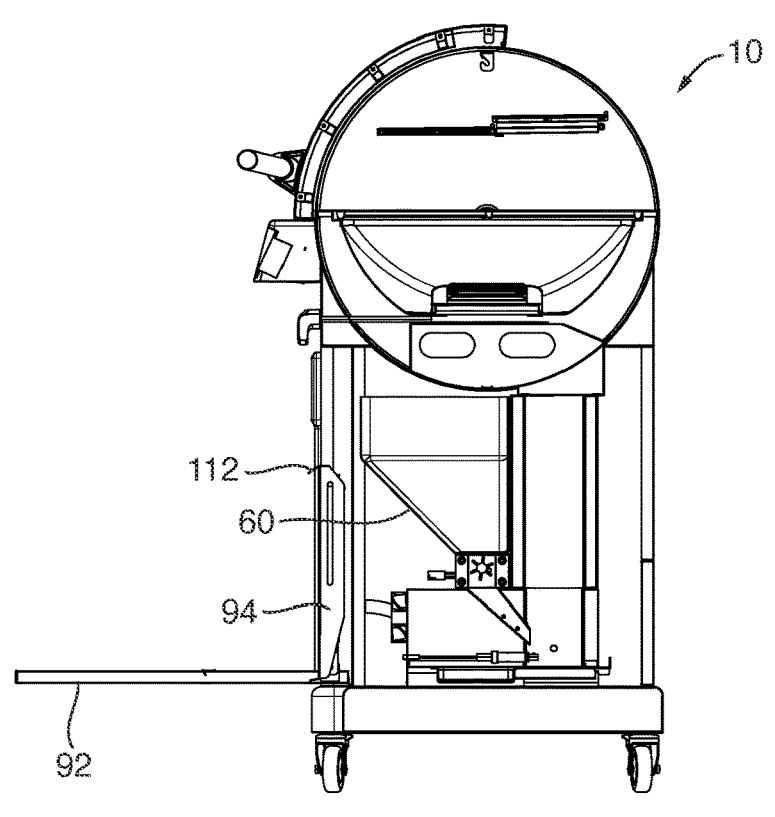
FIG. 7 is a side cross-sectional view of the cooking station, depicting the hopper door in a horizontal position with the hopper feed tray in a vertical closed position, according to another embodiment of the present invention.
Figure 8:
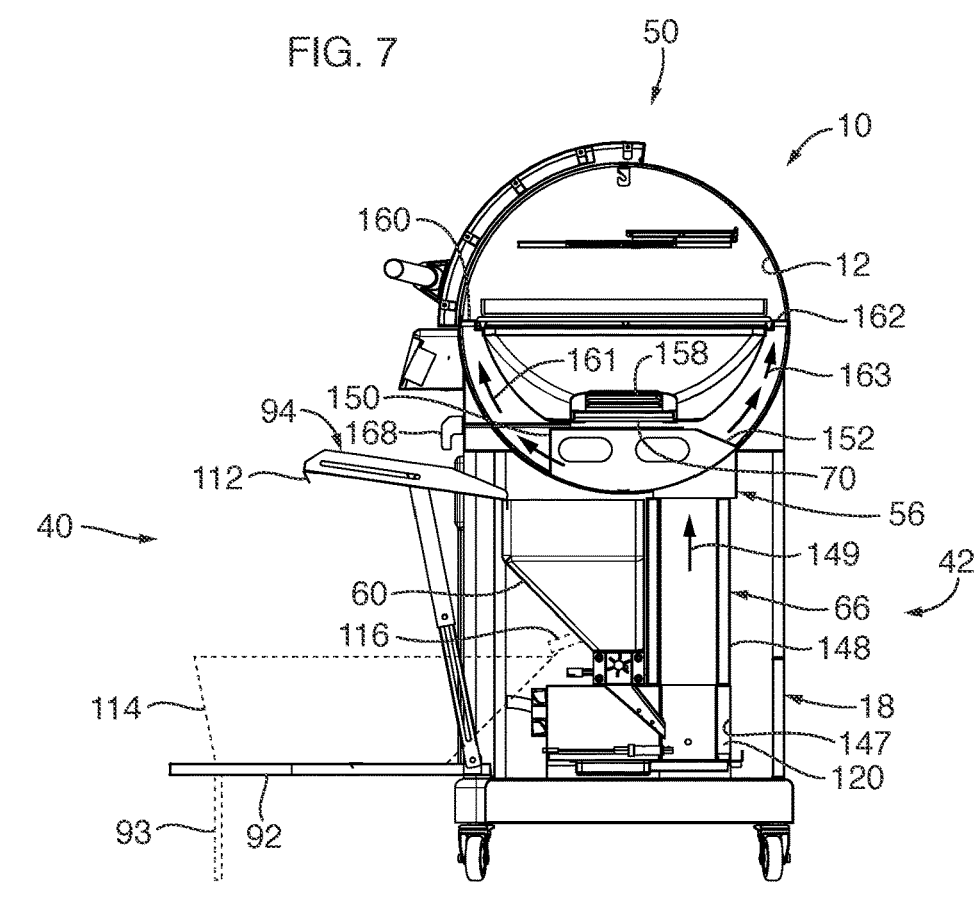
FIG. 8 is a side cross-sectional view of the cooking station, depicting the hopper door in the horizontal position with the hopper feed tray in an open position, according to another embodiment of the present invention.

With reference to FIGS. 7 and 8, additional detail of the door 92 and tray 94 of the cooking station 10 will now be described. For example, to access the hopper 60 for funneling pellets therein, the door 92 may be moved to an open position, such as a generally horizontal position, as shown in FIG. 7. Once the door 92 is open, then the tray 94 may also be moved to an open position, as depicted in FIG. 8. The door 92 may then be positioned under the downward extending lip 112 of the tray 94, as depicted and described relative to FIGS. 5 and 6, for supplying pellets to the hopper 60. In another embodiment, in order to remove pellets from the hopper 60, the door 92 and tray 94 may be oriented to open positions, similar to that depicted in FIG. 8, so that a storage bin 114 (shown in outline) may be positioned on the door 92 and so that the bin 114 is positioned under a pellet outlet 116 (shown in outline) defined along a lower portion of the hopper 60. The door 92 may be supported with a support stand 93 (shown in outline). With this arrangement, pellets may be readily cleaned out of the hopper 60 if desired by the user.

Figure 9:
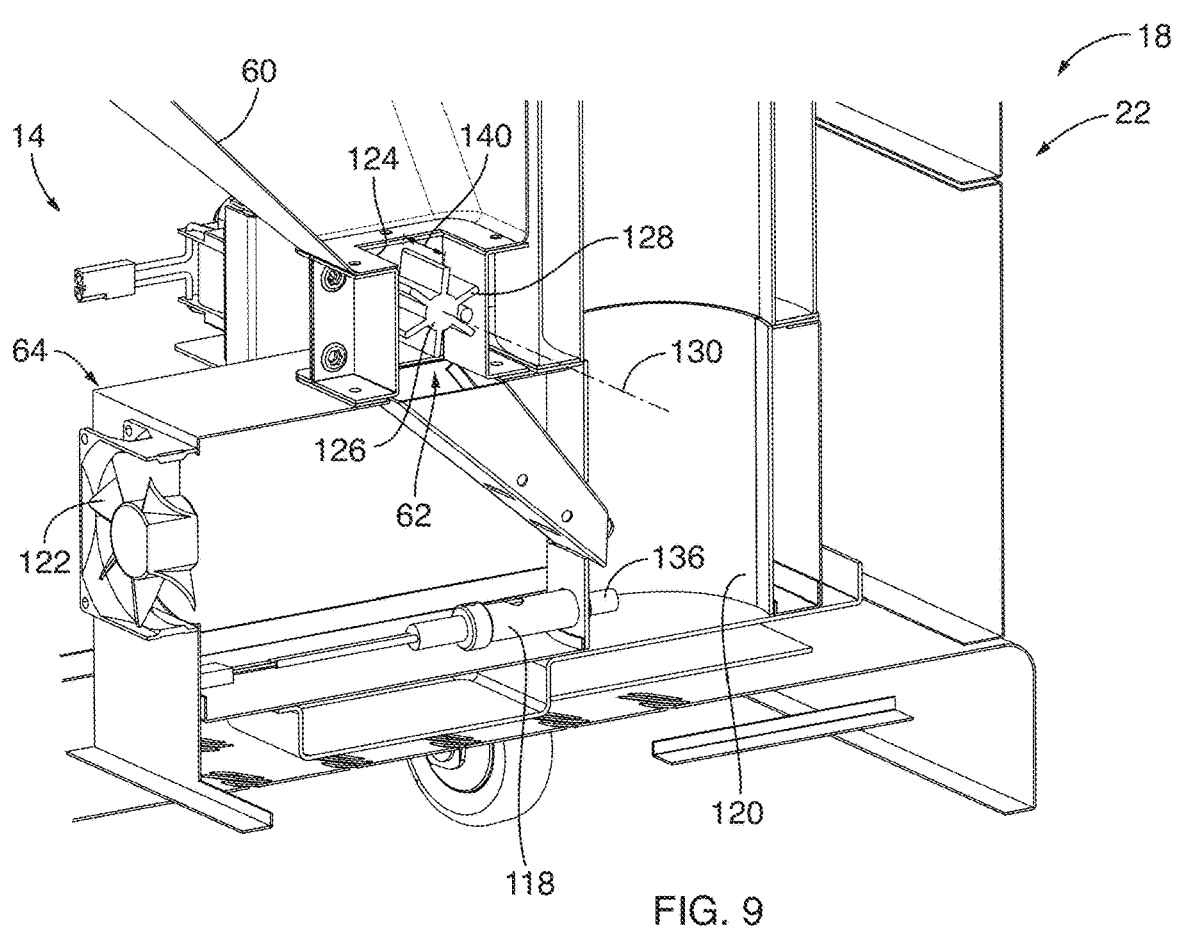
FIG. 9 is an enlarged cross-sectional perspective view of a portion of the cooking station, depicting a paddle wheel for feeding pellets to a fire pot, according to another embodiment of the present invention.

Now with reference to FIGS. 9 and 10, the pellet feeding portion 14 or system will now be described. As previously set forth, the pellet feeding portion 14 may include the hopper 60, the paddle wheel 62, and the pellet burning portion 64. Such pellet burning portion 64 may be positioned along the lower portion 22 of the main body 18 and positioned below the barrel type structure 38. The pellet burning portion 64 may include a hot rod 118, a fire pot 120 (or burn chamber), and one or more fans, such as fan 122. The hopper 60 may include sloped or vertical side walls extending downward to a hopper outlet 124. The hopper outlet 124 may lead to, and be positioned adjacently above, the paddle wheel 62. The paddle wheel 62 may include an axil 126 with paddles 128 extending radially from the axil 126. The paddle wheel 62 may rotate (in either direction) about an axis 130 defined by the axil 126, as shown by arrow 132, so as to move pellets 16 from the pellet hopper 60 and downward to drop from the paddle wheel 62 to a sloped surface 134 to then proceed into the fire pot 120. Such rotation of the paddle wheel 62 may be employed with a motor (not shown), as known to one of ordinary skill in the art. Further, the rotation of the paddle wheel 62 may be changed between clockwise and counter-clockwise. In other words, the paddle wheel may be adapted to be bi-rotational. The fire pot 120 may include a hot end portion 136 of the hot rod 118 positioned therein to burn the pellets 16. The hot rod 118 may be an elongated structure with one end sized and configured to be electrically heated to a temperature that can burn pellets positioned on and around the hot end portion 136 of the hot rod 118, as known to one skilled in the art. The fan 122 may push air to fan the burning pellets 16. Further, the sloped surface 134 may include vents 138 so that air flow from the fan 122 may move through the vents 138 to keep flames from burning back into the hopper 60. The burning of the pellets 16 facilitates heated smoke 121 to move upward through various ducts 66, discussed further herein.

As previously set forth, the paddle wheel 62 may exhibit multiple paddles 128 extending radially from the axil 126 of the paddle wheel 62. Each paddle 128 may define a length 140, a height 142, and a depth 144. The length 140 of each paddle 128 may be the dimension extending parallel with the axis 130. The height 142 of each paddle 128 may be the dimension extending radially from the axis 130 or perpendicular to the axis 130. The depth 144 dimension may be the thickness of each paddle 128 of the paddle wheel 62. Each paddle 128 may be spaced relative to an adjacent paddle 128 to define a predetermined gap 146, the gap sized and configured to minimize an amount and/or size of pellets positioned between each adjacently extending paddle 128 of the paddle wheel 62. Such gap 146 between adjacently extending paddles 128 may also be sized and configured to minimize potential jamming or clogging of the pellets 16 between the paddles 128 of the paddle wheel 62. Further, the gap 146 and paddles 128 may be sized and configured to break pellets into a more consistent pellet sizes, resulting in more controlled heating. The paddle wheel 62, as well as the motor for rotating the paddle wheel 62, may exhibit structure sized and configured to facilitate breaking odd sized pellets. With this arrangement, the paddle wheel 62 may move pellets 16 from the hopper 60 to the fire pot 120. In another embodiment, the pellet feeding portion 14 may incorporate multiple paddle wheels, such as two or three paddle wheels.

Figure 19:
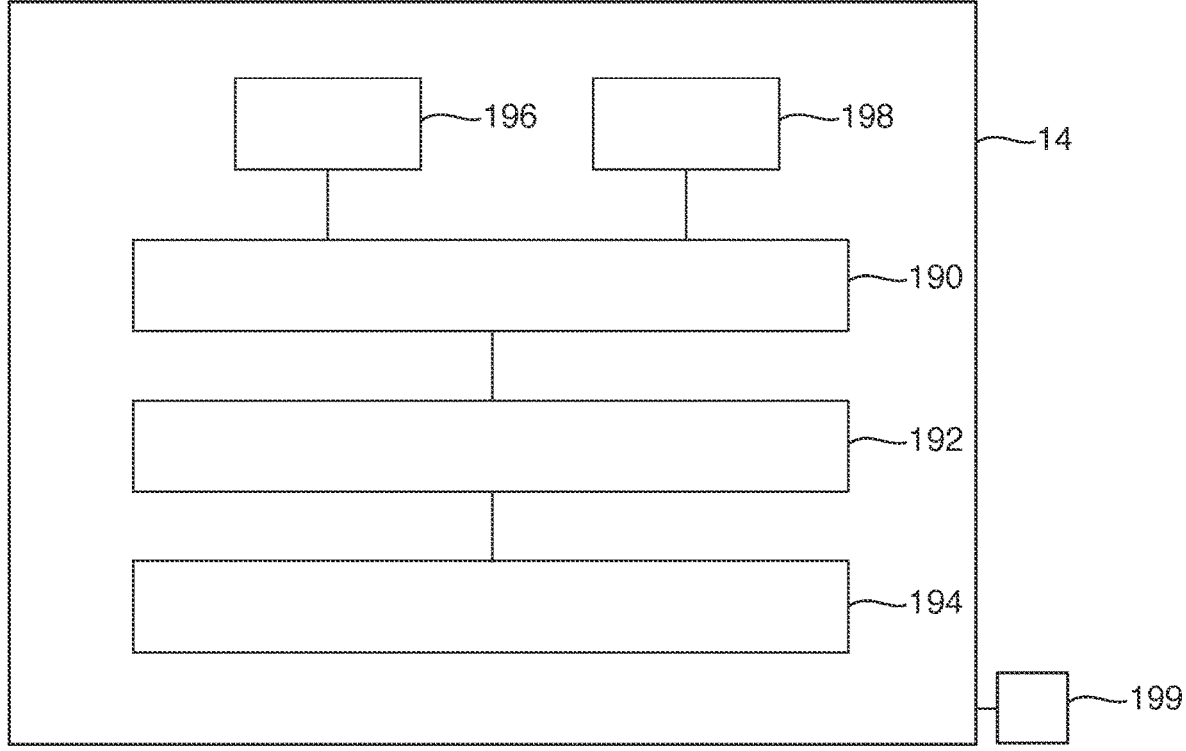
FIG. 19 is a schematic view of a control system associated with the cooking station, according to another embodiment of the present invention.

Furthermore, in another embodiment and with reference to FIGS. 1, 10, and 19, the pellet feeding portion 14 may include a control panel 190 positioned on, for example, the front side 40 of the main body 18 of the cooking station 10. The control panel 190 may be operatively coupled to components of the pellet feeding portion 14 and the cooking station 10. Further, the control panel 190 may be operatively coupled to a controller 192 and a temperature sensor 194. The control panel 190 may include input controls 196, such as input buttons, and an output 198, such as a display. Further, the pellet feeding portion 14 may be coupled to a power connection 199 for electrically powering the components coupled to the control panel 190 as well as the other components of the pellet feeding portion 14, as known to one of ordinary skill in the art. The controller 192 may be sized and configured to control components of the pellet feeding portion 14, such as the motor for the paddle wheel 62, the hot rod 118, and the one or more fans 122. The temperature sensor 194 may be positioned within or adjacent the cooking chamber 12 (FIG. 2) and may be sized and configured to sense an actual temperature of the cooking chamber 12, such that the actual temperature may be viewable on the display of the control panel 190. With this arrangement, a user of the cooking station 10 may employ the input controls 196 to input a period of time for cooking food in the cooking chamber 12 as well as input a desired temperature for maintaining the cooking chamber 12 of the cooking station 10 over the period of time. The controller 192 in cooperation with the temperature sensor 194 may control activation and deactivation of the motor of the paddle wheel 62 for supplying pellets into the fire pot 120 as well as activate and deactivate heating the hot rod 118 for burning the pellets to generate heated smoke. The controller 192 may also control running the one or more fans 122 to provide air flow to the fire pot 120 with the burning pellets to assist in the pellets burning hotter to generate additional heated smoke. Further, the controller 192 may control other fans for assisting in cooling the motor for the paddle wheel 62.

Upon the actual temperature of the cooking chamber 12 meeting the desired temperature previously set with the input controls 196, as sensed by the temperature sensor 194, the controller 192 may maintain the actual temperature to about the desired temperature in the cooking chamber 12 by activating the motor of the paddle wheel 62, the one or more fans 122, and/or the hot rod 118, as needed. In this manner, the actual temperature of the cooking chamber 12 may be maintained to approximately the desired temperature for the period of time set with the input controls 196 on the control panel 190. Further, in another embodiment, the input and output controls may be controlled and viewed remotely with application software via the Internet from a user's mobile phone or tablet/computer (not shown), as known to one of ordinary skill in the art. Such remote control may be advantageous due to the long period of time required to cook food through heated smoke in the smoker chamber 20.

Now with reference to FIGS. 8 and 11-13, as previously set forth, the venting system 56 may include one or more ducts 66, the heat distribution portion 68, and the sliding vent 70. The one or more ducts 66 may include a vertically extending duct 148 that may extend directly from the fire pot 120 so that heated smoke from the fire pot 120 may move upward through duct 148, as shown by arrow 149, and toward the cooking chamber 12. Such vertically extending duct 148 and fire pot 120 (or burn chamber) may be insulated with fiber glass or ceramic, the insulation positionable within a gap 147 formed around the fire pot 120 and duct 148. Prior to heated smoke reaching the cooking chamber 12, the vertically extending duct 148 may extend to the heat distribution portion 68. The heat distribution portion 68 may include multiple vent sides, such as a front vent side 150, a rear vent side 152, a first vent side 154, a second vent side 156 each of which may correspond with the respective front side 40, rear side 42, first side 44 and second side 46 of the main body 18 of the cooking station 10. Further, the heat distribution portion 68 may include a top vent side 158 corresponding with the top side 50 of the cooking station 10. Each of the first and second vent sides 154, 156 and the front and rear vent sides 150, 152 may be fixedly positioned vented panels that facilitate heated smoke to move outward and upward to the peripheral vent portion 90 of the cooking chamber 10. Further, upon exiting the multiple vent sides, the heated smoke moves outward and upward along an underside of a drainage floor 170 and then to the peripheral vent portion 90 of the cooking chamber 12.

For example, heated smoke may exit venting of the front vent side 150 of the heat distribution portion 68 to proceed to a front peripheral portion 160, as shown by arrow 161 in FIG. 8. Likewise, heated smoke may exit venting of the rear vent side 152 of the heat distribution portion 68 to proceed to a rear peripheral portion 162, as shown by arrow 163 in FIG. 8. Further, heated smoke may exit venting of the first vent side 154 to extend to a first peripheral side 164 (see FIG. 13) of the peripheral vent portion 90, as shown by arrow 165 in FIG. 11. Similarly, heated smoke may exit venting of a second vent side 156 of the heat distribution portion 68 proceeds to a second peripheral side 166 of the peripheral vent portion 90, as shown by arrow 167 in FIG. 11. Further, in another embodiment, the heat distribution portion 68 may extend with more or less vent sides (or a rounded vent distribution portion) to facilitate channeling heated smoke outward and upward to the peripheral vent portion 90 of the cooking chamber 12.

As previously set forth, the top vent side 158 of the heat distribution portion 68 may be a sliding vent 70. The sliding vent 70 may be moved between a closed position and an open position. In the closed position, heated smoke may not move through the sliding vent 70, but only through the front and rear vent sides 150, 152 and the first and second vent sides 154, 156. To move the sliding vent 70 to the open position, a vent handle 168 may be moved, such as being moved linearly outward, as shown by arrow 169, which adjusts the top vent side 158 to allow heated smoke through the top vent side 158. As heated smoke is moved through the top vent side 158, the heated smoke moves directly under a main cooking portion 76 of the cooking chamber 12. As such, with the vent handle 168 in the open position, heated smoke moves through both the peripheral vent portion 90 as well as to the underside of the main cooking portion 76 of the cooking chamber 12.

Figures 13, 14:
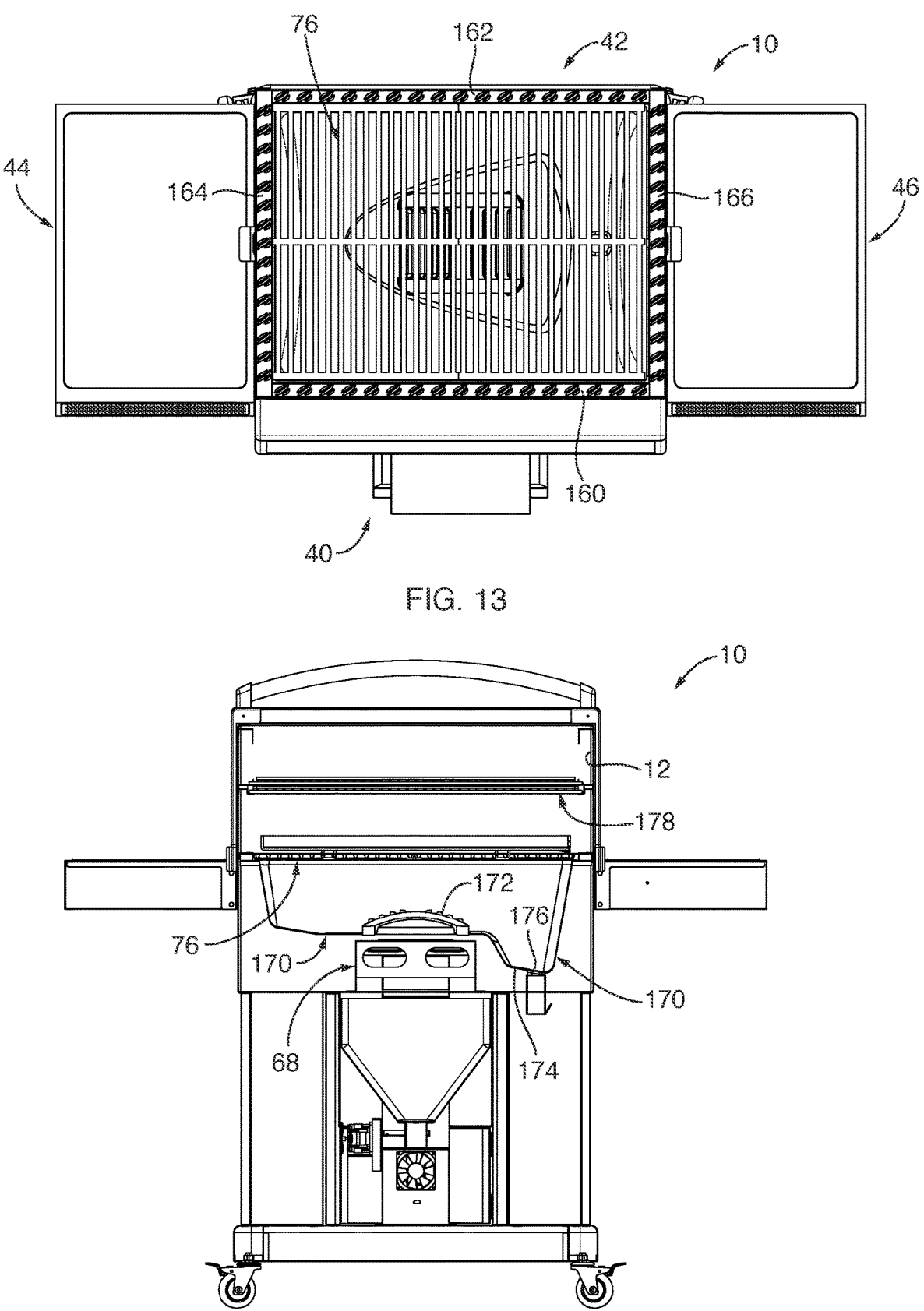
FIG. 13 is a top view of the cooking station (without the hood and upper racks), depicting the main cooking portion and peripheral vent portions surrounding the main cooking portion, according to another embodiment of the present invention.
FIG. 14 is a rear cross-sectional view of the cooking station, depicting a surface profile of a drainage system of the cooking station, according to another embodiment of the present invention.
Figure 15:
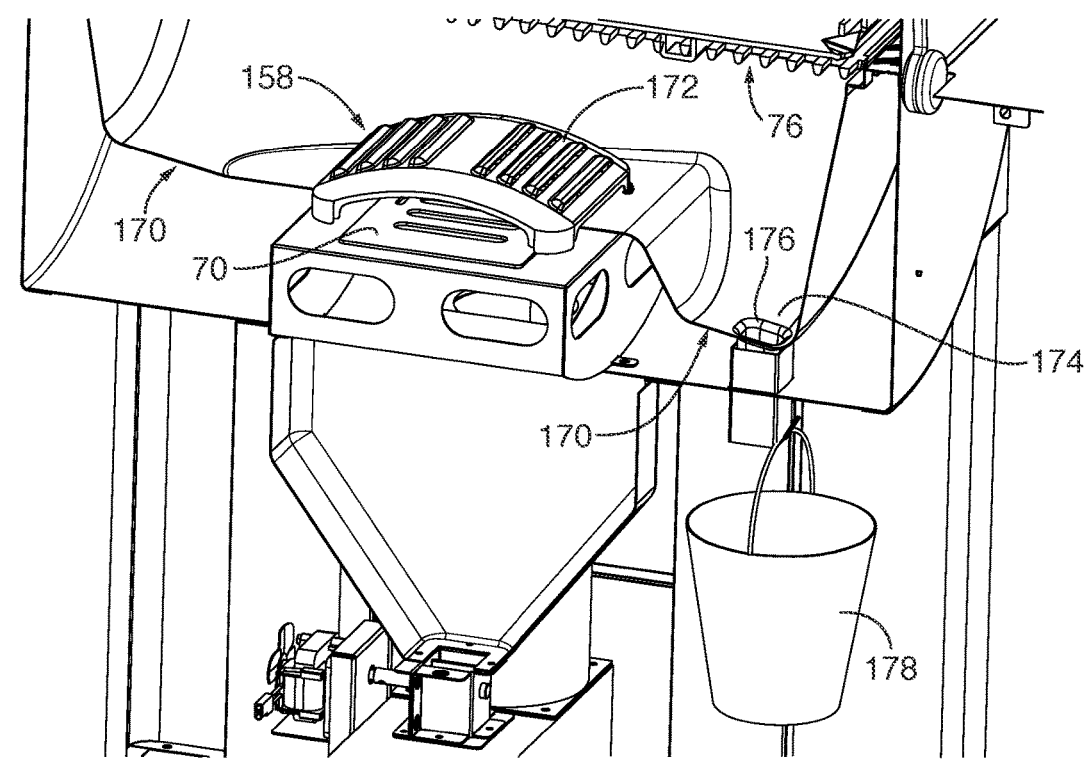
FIG. 15 is an enlarged perspective view of a drain hole in the drainage system of the cooking station, according to another embodiment of the present invention.

Now with reference to FIGS. 14-15, the drainage of food byproduct from the cooking chamber 12 of the cooking station 10 will now be described. For example, as food is placed in the cooking chamber 12 over the main cooking portion 76 and/or the upper cooking portion 78, drippings fall through the main and upper cooking portions 76, 78 to the drainage floor 170 that may at least partially surround the heat distribution portion 68. Further, a deflecting member 172 may be positioned over the sliding vent 70 along the top vent side 158 to prevent food byproduct drippings from directly falling through the sliding vent 70. Any drippings that may fall on the deflecting member 172 may be funneled to the drainage floor 170. Such drainage floor 170 may be sloped toward a lower-most portion 174 of the drainage floor 170. The lower-most portion 174 may define a drainage outlet 176 or through hole that a grease cup 178 may be positioned under so as to catch the drippings draining from the drainage floor 170 and through the drainage outlet 176.

Figure 16:
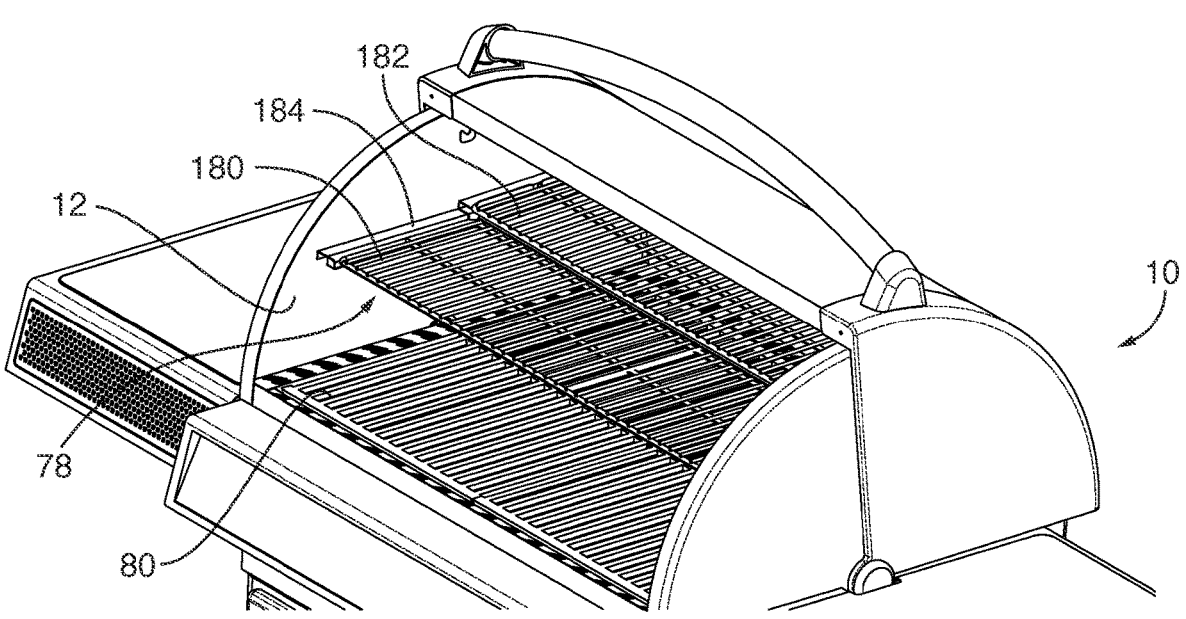
FIG. 16 is a perspective view of a top portion of the cooking station, depicting an upper rack in an extending position in the top portion of the cooking station, according to another embodiment of the present invention.
Figure 17:
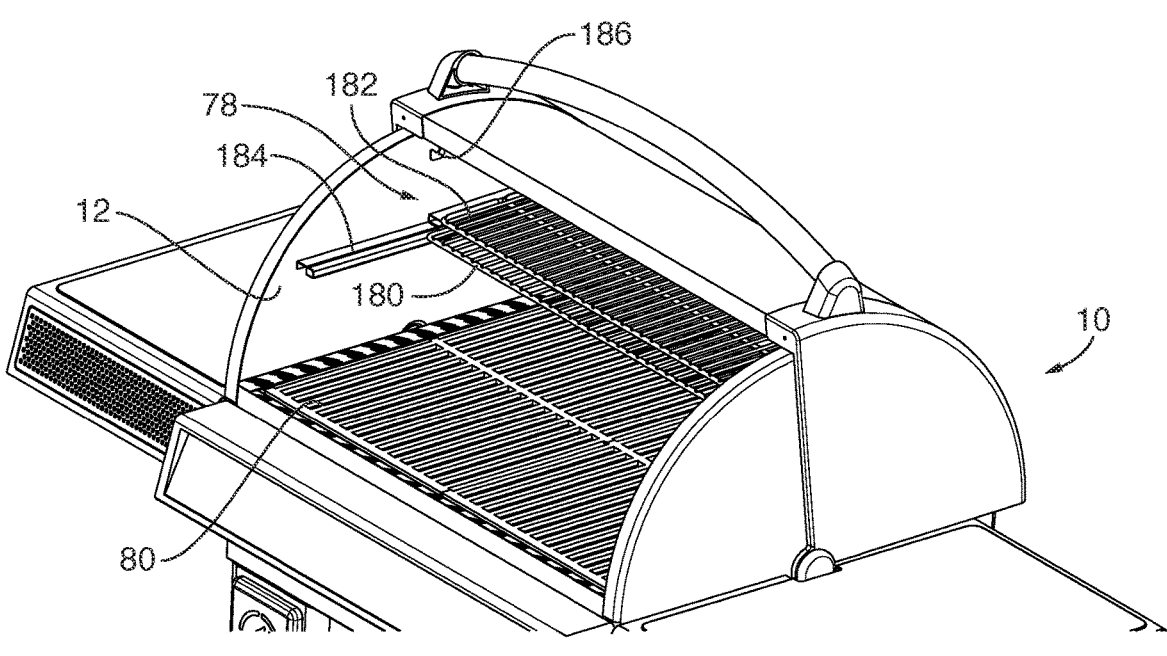
FIG. 17 is a perspective view of the top portion of the cooking station, depicting the upper rack in a retracted position in the top portion of the cooking station, according to another embodiment of the present invention.
Figure 18:
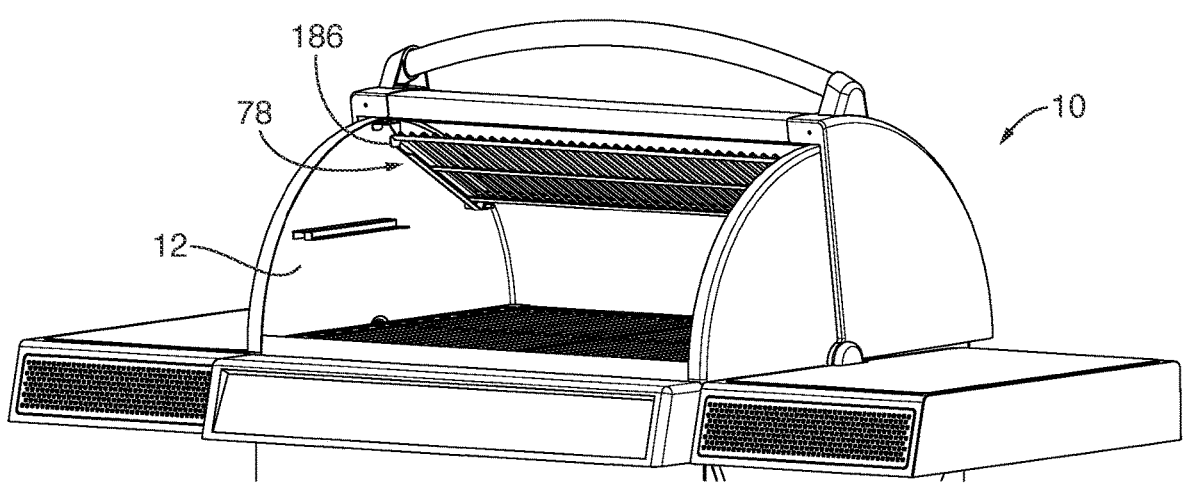
FIG. 18 is a perspective view of the top portion of the cooking station, depicting the upper rack in a pivoted position in the top portion of the cooking station, according to another embodiment of the present invention.

With reference to FIGS. 16-18, the upper cooking portion 78 extending in the cooking chamber 12 of the cooking station 10 will now be described. As depicted in FIG. 16, the upper cooking portion 78 may include a forward grill rack 180 and a rearward grill rack 182 in an extended position. In the extended position, the forward grill rack 180 may be positioned at a forward position along a track 184, the track 184 extending along opposite first and second sides of the cooking chamber 12. This extended position of the upper cooking portion 78 provides a maximized grill surface area for the upper cooking portion 78 along with the main grill 80. The upper cooking portion 78 may also be moved to a retracted position, as depicted in FIG. 17. In the retracted position, the forward grill rack 180 may be slidingly moveable along the track 184 to move the forward grill rack 180 to a rearward position so as to be adjacently below the rearward grill rack 182. With the upper cooking portion 78 in the retracted position, there may be additional space available above the main grill 80 so that the user may cook larger food items on the main grill 80. As depicted in FIG. 18, the upper cooking portion 78 may also be moved to a pivoted position such that the upper cooking portion 78 may be manually pivoted and positioned with one or more hooks 186. In the pivoted position, the upper cooking portion 78 is pivoted away from the main grill 80 so as to provide additional space for cooking over the main grill 80, as desired by the user, or as needed to cook larger food items thereon.

The various structural components of the various embodiments of the cooking station 10 (as well as cooking station 200), the pellet feed portion 14 and the associated various sub-systems, such as the ducting portion 56, grease draining portion 58, and any other structural components set forth herein or needed, as known to one of ordinary skill in the art, may be formed of various metallic materials, such as steel, stainless steel, copper, aluminum or any other suitable material with high temperature ratings, such as various suitable polymeric materials, and may be formed from known structural components, such as sheet metal at various gauges/thicknesses or other known metallic structures, such as tubing or the like, and may be formed and manufactured through various known processes and techniques known in the art, such as casting, welding, rolling, bending, pressing, fastening, etc., as known by one of ordinary skill in the art.

Figures 20, 21:
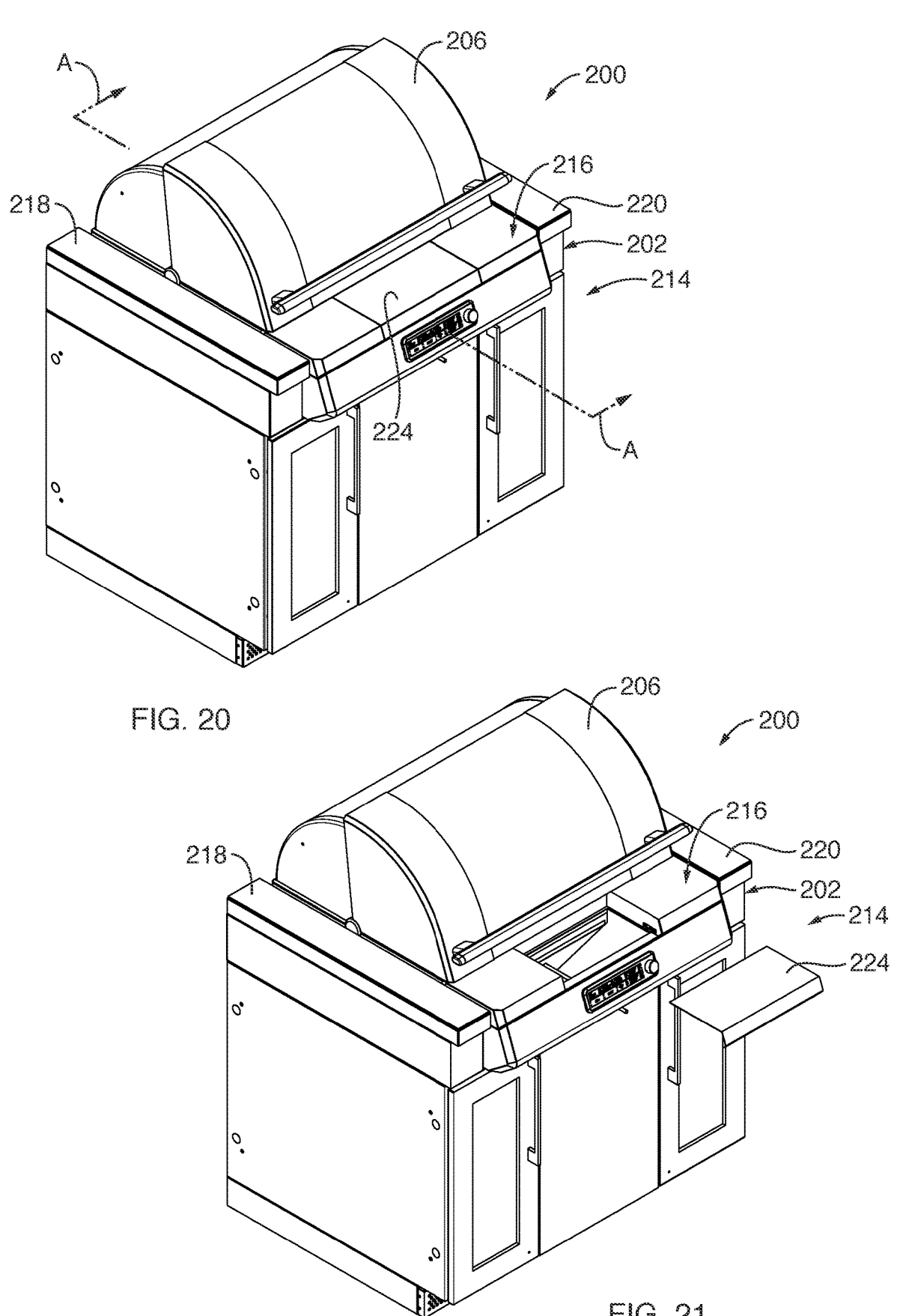
FIG. 20 is a perspective view of another embodiment of a cooking station, according to the present invention.
FIG. 21 is a perspective view of the cooking station of FIG. 20, depicting a door for a hopper of the cooking station in a displaced position, according to another embodiment of the present invention.
Figure 22:
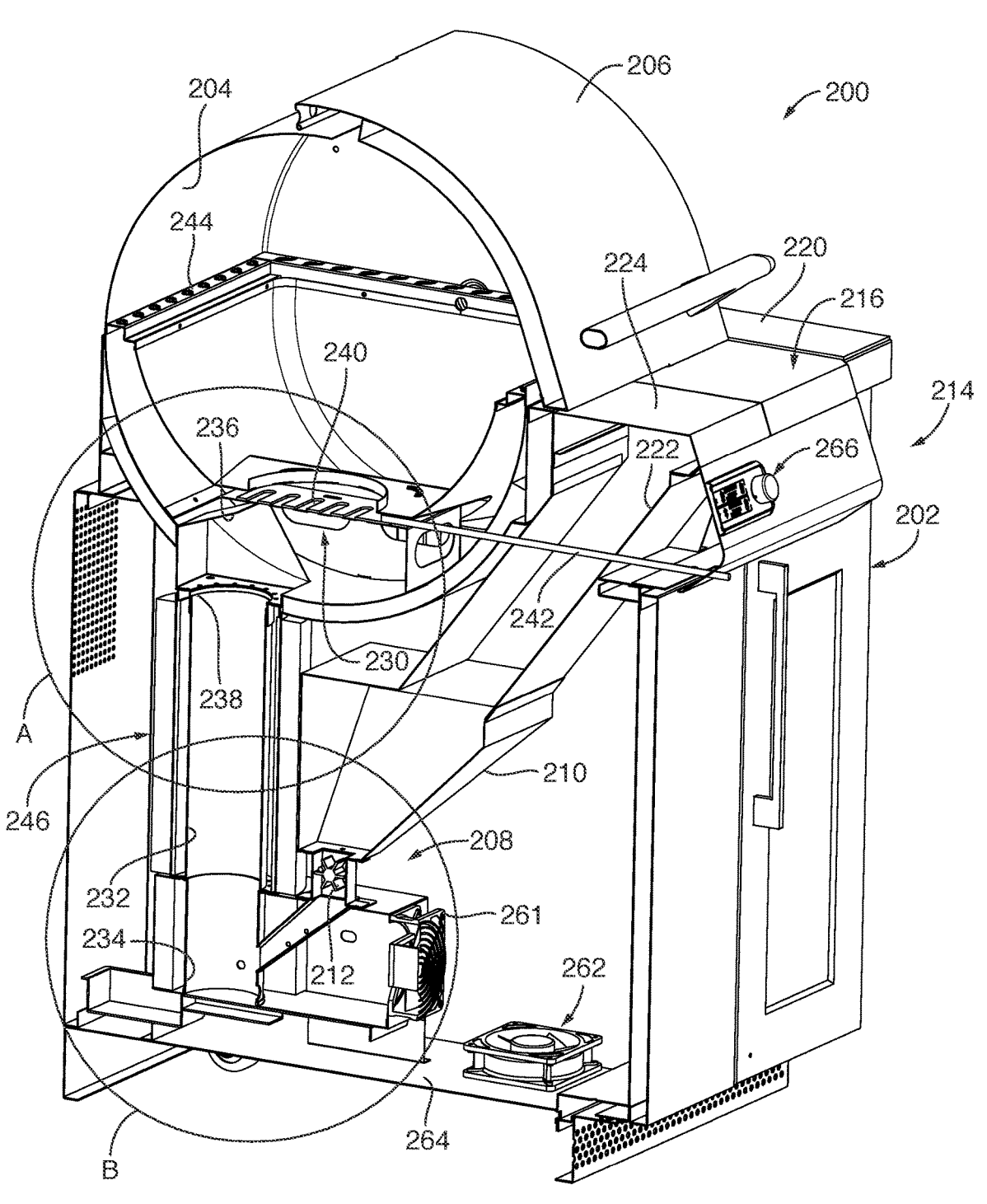
FIG. 22 is a cross-sectional view of the cooking station taken along section line A-A of FIG. 20, depicting a grill removed from a cooking chamber of the cooking station, according to another embodiment of the present invention.

Now with reference to FIGS. 20-22, another embodiment of a cooking station 200 with substantially similar structure and functional components as set forth in the previous embodiment. For example, similar to the previous embodiment, the cooking station 200 may include a main body 202 defining a cooking chamber 204, a hood 206 for the cooking chamber 204, a pellet feeding portion 208 with a hopper 210 and a paddle wheel 212, various venting and ducts for controlling heat flow, as well as the various structural and functional components associated with the cooking station 200 similar to or the same as the other components of the previous embodiment of the cooking station 10 (FIG. 1). In this embodiment, a front side 214 of the cooking station 200 may extend forward of the hood 206 with a front flat shelf surface 216. The front flat shelf surface 216 may extend from and at substantially the same level or height as first and second side shelves 218, 220 of the cooking station 200. Such front side 214 may extend forward so that a hopper chute 222 may be accessed along the front side 214 and also may be stationary, as opposed to the pivoting door 92 and hopper feeding tray 94 of the previous embodiment (see FIG. 5). The hopper chute 222 may be accessed by removing a lid 224 defined in the front flat shelf surface 216. In other words, the front flat shelf surface 216 may extend to include the lid 224, upon the lid 214 being in the closed position. Upon removing the lid 214, the hopper chute 222 may then be accessible to define an access opening to the hopper chute 222 to funnel pellets to the hopper 210 and the paddle wheel 212 of the cooking station 200, similar to the previous embodiment. In another embodiment, the lid 224 for accessing the hopper chute 222 may be pivotably coupled to the main body 202 of the cooking station 200. In another embodiment, the lid 224 for the hopper chute 222 may be centrally located along the front side of the main body 202. In another embodiment, the lid 224 for accessing the hopper chute 222 may be positioned directly adjacent the hood 206 (upon the hood being in a closed position).

Figure 22A:
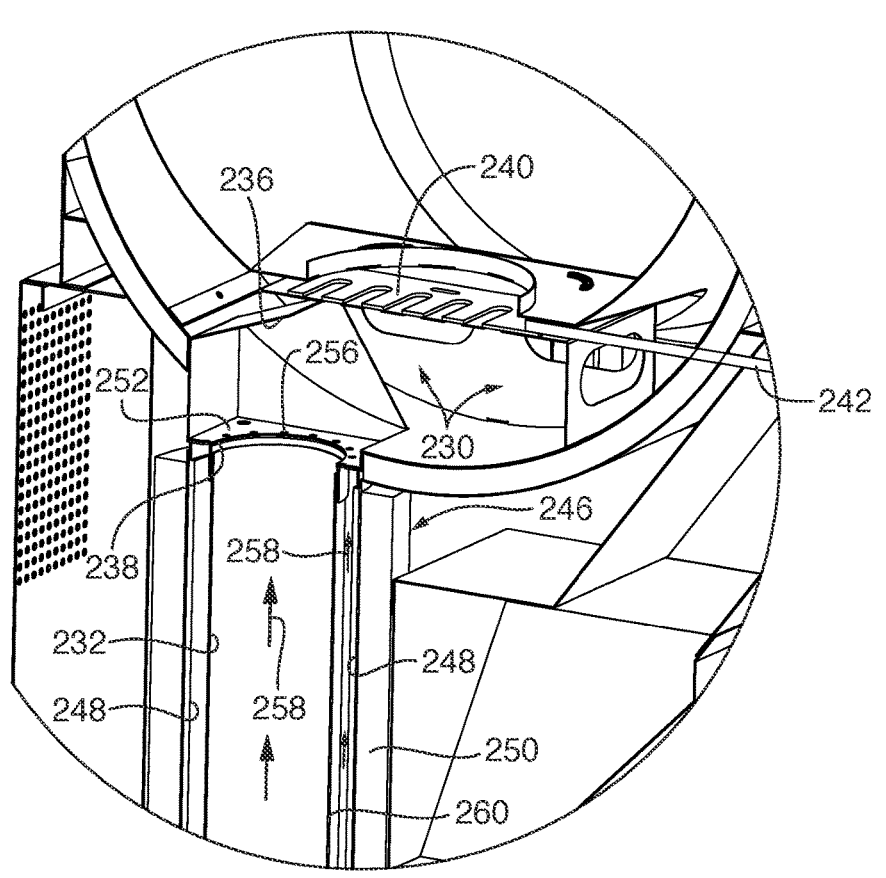
FIG. 22A is an enlarged view of the cooking station taken from region A of FIG. 22, according to another embodiment of the present invention.

Further, with reference to FIGS. 22 and 22A, ducts of a heat distribution portion 230 may include a vertically extending duct 232 for vertically funneling heated smoke upward from a fire pot 234 toward the cooking chamber 204, similar to the previous embodiment. In this embodiment, the cooking station 200 may include a deflector member 236 that may be positioned adjacent a top end 238 of the vertically extending duct 232. The deflector member 236 may be sized and configured to deflect the heated smoke directly to a sliding vent 240. The sliding vent 240 may be coupled to a rod 242 and vent handle (not shown) for moving the sliding vent 240 between open and closed positions, as set forth in the previous embodiment. Upon the sliding vent 240 being in the closed position, the heated smoke may move laterally through the heat distribution portion 230 to enter the cooking chamber 204 through side vents 244. Upon the sliding vent 240 being in the open position, the heated smoke may move directly upward through the sliding vent 240 and below the grill (not shown in FIG. 22 for simplification purposes) and into the cooking chamber 204, as well as move laterally through the heat distribution portion 230 and into the cooking chamber 204 via the side vents 244.

Figure 22B:
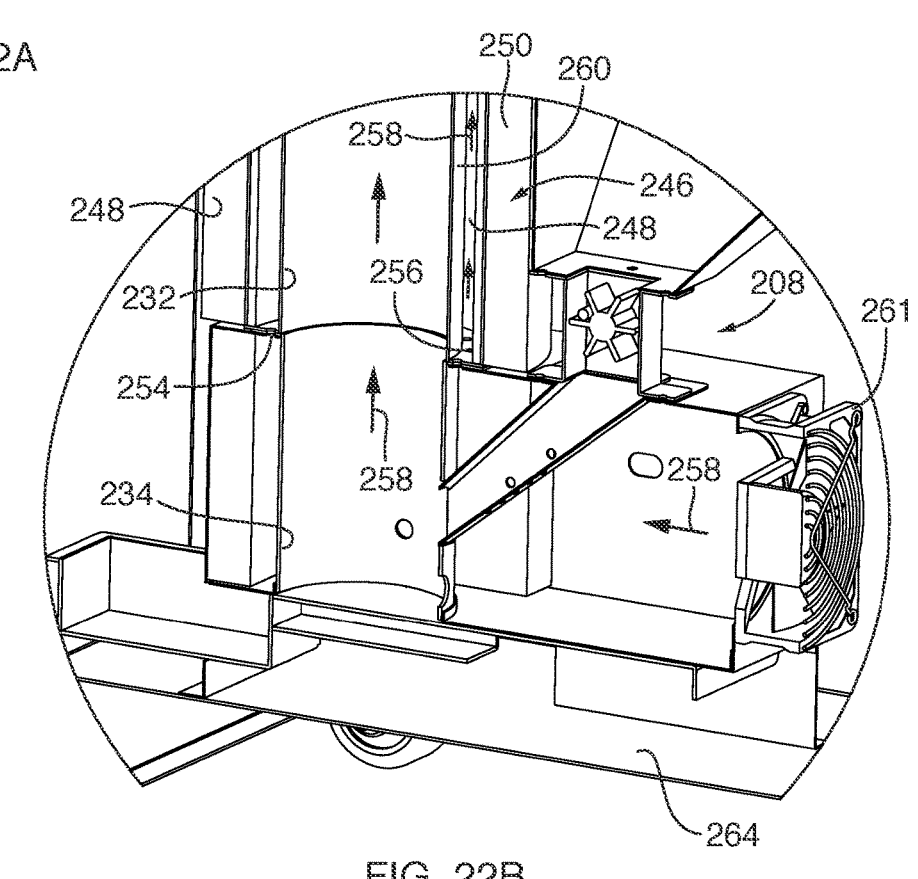
FIG. 22B is an enlarged view of the cooking station taken from region B of FIG. 22, according to another embodiment of the present invention.

In addition, with respect to FIGS. 22, 22A and 22B, the vertically extending duct 232 may include a sleeve portion 246 that extends along the vertically extending duct 232 so as to surround the vertically extending duct 232. The sleeve portion 246 may be sized to define an air gap 248 between the vertically extending duct 232 and the sleeve portion 246. The sleeve portion 246 may extend with an insulative material 250 therealong or within a dual sleeve member having the insulative material 250 therein. The air gap 248 may extend along and around an outer surface 260 of the vertically extending duct 232. Further, the air gap 248 may include an upper ring cap 252 and a lower ring cap 254 positioned over opposite ends of the air gap 248 and adjacent opposite ends of the vertically extending duct 232. Each of the upper and lower ring caps 252, 254 may include a series of air flow openings 256 defined therein sized and configured to facilitate air flow, as depicted by arrow 258, along the outer surface 260 of the vertically extending duct 232. Further, the pellet feeding portion 208 may be associated with a first fan 261 and a second fan 262. Similar to that described in the previous embodiment, the first fan 261 may be employed for providing air flow, as shown by arrow 258, to the fire pot 234 for fanning the burning pellets, to then provide air flow upward through the duct 232 as well as along the air gap 248 to move air through the heat distribution portion 230 and toward the cooking chamber 204. The second fan 262 may be positioned along the floor panel 264 and may assist in bringing external air within the main body 202 of the cooking station 200 and within the area of the first fan 261 so that the first fan 261 may draw upon the external air. In this manner, the first and second fans 261, 262 may cooperate to funnel air through the ducts and venting toward the cooking chamber 204 of the cooking station 200. Further, as previously set forth, the air flow 258 may move through the openings 256 defined in the upper and lower ring caps 252, 254 and through the air gap 248 to move along the outer surface 260 of the duct 232 to facilitate cooling the vertically extending duct 232. Further, the second fan 262 may be controlled with a controller and various heat sensors with input and output controls that may be associated with a control panel 266 each associated with the cooking station 200, similar to that depicted and described relative to FIG. 19 in the previous embodiment.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An outdoor cooking station configured to be at least partially heated with burning pellets, comprising:

a main body having panels and frame components extending to define a front side, a rear side, a left side and a right side each extending from a lower end to a cooking chamber in an upper portion of the main body, the cooking chamber having a grill with a grill cooking surface;

a duct system including a heat distribution portion, a lower duct, a peripheral duct, and a peripheral vent, the heat distribution portion having a movable vent associated therewith, the moveable vent configured to be moved between an open position and a closed position, the peripheral duct having a peripheral duct wall extending from the heat distribution portion to the peripheral vent, the peripheral vent positioned adjacent to an outer periphery of the grill, the peripheral duct extending to define a gap between the panels of the main body and the peripheral duct wall such that the peripheral vent is positioned over the gap of the peripheral duct so that the peripheral vent extends along the outer periphery of the grill; and a pellet feeding system including a pellet hopper, a paddle wheel, and a fire pot, the paddle wheel sized and configured to rotate about an axis defined by the paddle wheel, the paddle wheel including multiple paddles extending radially relative to the axis, the paddle wheel configured to receive pellets from a bottom opening of the pellet hopper such that one or more pellets are received between adjacently extending paddles of the paddle wheel to move the pellets in a controlled manner to the fire pot so that a hot rod burns the pellets in the fire pot so that heated smoke moves upward through the lower duct and toward the heat distribution portion;

wherein, upon the moveable vent being moved to the open position, the heated smoke is moveable from the heat distribution portion to move upward directly below the grill and into the cooking chamber and, wherein, upon the moveable vent being moved to the closed position, the heated smoke is moveable from the heat distribution portion to move through the gap of the peripheral duct along the peripheral duct wall, out of the peripheral vent, and into the cooking chamber.

2. The outdoor cooking station of claim 1, wherein the paddle wheel rotates to move pellets about the axis of the paddle wheel in a non-linear manner.

3. The outdoor cooking station of claim 1, wherein the paddle wheel is rotatable about the axis in a bi-rotational manner.

4. The outdoor cooking station of claim 1, wherein the paddle wheel is sized and configured to move the pellets in a non-linear, rotating manner such that the pellets rotate with the paddle wheel.

5. The outdoor cooking station of claim 1, wherein the paddle wheel includes at least six paddles extending radially relative to the axis of the paddle wheel.

6. The outdoor cooking station of claim 1, wherein the lower duct extends to a deflector member, the deflector member positioned to deflect heated smoke to the moveable vent below the cooking chamber.

7. The outdoor cooking station of claim 1, wherein the front side of the main body defines an access opening with a moveable lid, the access opening sized and configured to receive the pellets to the hopper.

8. The outdoor cooking station of claim 1, wherein the hopper is positioned below the cooking chamber such that the hopper is positioned within a cabinet structure of the main body.

9. The outdoor cooking station of claim 1, wherein the peripheral vent and the peripheral vent wall are positioned to at least partially support the grill.

* * * * *